United States Patent [19]

Nagahara et al.

[11] 4,143,399

[45] Mar. 6, 1979

[54] IMAGING DEVICE

[75] Inventors: Shusaku Nagahara, Kokubunji; Kenji Takahashi, Ebina; Mamoru Nonaka, Kokubunji, all of Japan

[73] Assignees: Hitachi, Ltd.; Hitachi Denshi Kabushiki Kaisha, both of Japan

[21] Appl. No.: 806,854

[22] Filed: Jun. 15, 1977

[30] Foreign Application Priority Data

Jun. 18, 1976 [JP] Japan ................................ 51-71141

[51] Int. Cl.$^2$ ................................ H04N 9/07

[52] U.S. Cl. ................................ 358/44

[58] Field of Search ..................... 358/55, 44, 45, 223

[56] References Cited

U.S. PATENT DOCUMENTS

| | | | |
|---|---|---|---|
| 2,296,908 | 9/1942 | Crosby | 358/44 |
| 3,590,145 | 6/1971 | Schneider | 358/223 |
| 3,767,846 | 10/1973 | Okubo | 358/44 |
| 4,031,551 | 6/1977 | Nobutoki et al. | 358/223 |

*Primary Examiner*—Richard Murray
*Attorney, Agent, or Firm*—Craig & Antonelli

[57] ABSTRACT

Disclosed is an imaging device having an image pick up tube provided with a color selective stripe filter. Means are provided for parallel light beams in the longitudinal direction of the stripe filter, as a bias light to be applied onto a photo-conversion layer on the image pick up tube through the filter.

8 Claims, 16 Drawing Figures

IMAGING DEVICE

BACKGROUND OF THE INVENTION (1) Field of the Invention

The present invention is concerned with an imaging device provided with means for applying bias-light, suitable for use as an imaging device having a color selective stripe filter. More specifically, the present invention relates to an imaging device having improved lag characteristics due to an improved manner of application of a bias-light which is a faint light adapted to be evenly applied to an image pick up portion for attenuating a lag.

The present invention can be suitably applied particularly, but not exclusively, for photoconductive image pick up tubes.

(2) Description of the Prior Arts

In picking up the image of a low light level object by an image pick up tube, there is a practical problem of lag. Conventionally, in order to avoid this lag in photoconductive image pick up tube, it has been proposed to uniformly apply a faint light onto the photo-conductive layer of the image pick up tube. This method is referred to as "bias-light method."

The lag in the photoconductive image pick up tube can be largely devided into two components of photoconductive lag and capacitive lag. The photoconductive lag depends on the life span of carriers generated in the photoconductive body by the application of the light until the extinction thereof due to a recombination in the photoconductive body, or on the running time in which the carriers drift through the photoconductive body, and is largely affected by carrier traps existing the photoconductive body. On the other hand, the capacitive lag is determined by a time constant $\tau = RC$ which is a product of the capacitance C of a target consisting of a photoconductor corresponding to a dielectric body and of a transparent conductive electrode scanned by an electron beam, and a resistance R by which the electron beam is encountered.

In general, two advantages are expected from an application of a faint light on the photoconductive layer on the photoconductive element of the tube.

One of these advantages is that the effective life span of the carrier or the running time thereof is conveniently reduced due to a reduction of the effect of the traps, while the other being a reduction of differential resistance of the scanning electron beam due to a displacement of the zero operation point of the target.

These effects are both effective to reduce the lag on the photoconductive tube.

This advantageous phenomenon constitutes the principle of the bias-light method for reducing the lag, and has been an essential factor in designing a camera.

Meanwhile, TV camera systems have been proposed which have a color selective stripe filter on the surface of the image pick up tube, for performing a sampling for respective colors, so as to reduce the number of image pick up tubes, through so called multiplexing of the colored picture in the spatial frequency domain.

FIGS. 1*a* and 1*b* in combination show an example of a surface of an image pick up tube having a color stripe filter, for use in TV camera system, in which FIG. 1*a* shows a plan, while FIG. 1*b* shows a cross-section of the surface.

Referring to those Figures, the color selective stripe filter 1 includes, for example, stripe filters 1R, 1G and

1B, capable of selecting colors of red, green and blue, respectively. The color selective filter 1 is adhered to a substrate 2 consisting of a glass plate, and is adapted to perform a spatial sampling of color lights 6 from an object. In general, a transparent surface layer or film 3 is provided for protecting the filter and for rendering the surface of the filter smooth, since the surface of the filter 1 usually involves a height differential depending on the colors. A conductive film 4 is provided on the transparent film 3, for playing a role of a signal electrode for imparting a bias potential.

The conductive film 4 is divided into two or three sections, or alternatively, not divided, depending on the methods of electrically demodulating the spatially multiplexed light signal, in relation to the direction of the color selective stripe filter or the pitch thereof.

The conductive film 4 is covered with a photoconductive layer 5 for converting the light into charges for a scanning by an electron beam, so as to produce an electrical signal at the signal electrode.

In most of the image pick up tubes provided with the color selective stripe filter of this kind, the photoconductive body is constituted by antimony trisulfide the production of which has been commercially settled. The reduction of the lag in the photoconductive body of this material by the application of the bias light is so small that the bias-light method has seldom been applied for the image pick up tube.

However, the bias-light method is becoming popular, in correspondence with the development of photoconductive materials such as lead oxide and cadmium selenide which exhibit a remarkable effect of reduction of lag by the application of the bias light, particularly in color TV camera relying upon multi-tube system e.g. 3-tube system.

The use of the bias light is, however, still not popular, for the system incorporating a color selective stripe filter, partly because of an increase of dark current and shortening of the life span which are attributable to an irregularity of contact between the photoconductive body of these materials and the signal electrode, and partly because of problems during processing such as an undesirable change of color of the color selective stripe filter due to a high-temperature treatment during the manufacture of the photoconductive layer.

Under these circumstances, the demand for a compact, light-weight and easily adjustable TV camera system is increasing, which in turn activates the development of image pick up tubes having a color selective stripe filter, as well as the study and investigation on the photoconductive layer itself. Consequently, photoconductive image pick up tubes having improved sensitivity and durability have become available.

The present inventors have attempted to apply the technique of the bias-light method which has been popular for the multi-tube system, e.g. 3-tube system, to the photoconductive image pick up tube having a color selective stripe filter.

Typical bias light method technique incorporates an annular light source provided just in front of the surface of an image pick up tube, as shown in FIGS. 2*a* and 2*b*, which is detailed in Japanese Patent Publication No. 24906/1970 and so on. Alternatively, it has been proposed in Japanese Patent Publication No. 13973/1976 to use a clad rod arranged optically opposing to the light-receiving surface of the image pick up tube, so as to make use of the light radiated externally of the clad rod.

These proposed techniques are intended for imparting to the photoconductive layer a bias light of small shading, by applying light uniformly to the face plate or the light-receiving surface of the image pick up tube.

More specifically, referring to FIGS. 2*a* and 2*b*, a ring-shaped box 8 is provided on the glass substrate plate 2 of the image pick up tube, so as to encircle a light source 9 which may be an incandescent lamp or a light emitting diode. The inner peripheral surface of the ring-shaped box 8 constitutes a light diffusion surface 20, while the inner surface 21 of the outer periphery of the box 8 and the inner surface 22 of the cover of the box in combination act as reflective diffusion surfaces. The surface 23 in contact with the glass substrate plate 2 of the image pick up tube is made non-transmissive. Thus, the face plate of the image pick up tube is adapted to receive the light diffused from all directions.

A test was conducted to apply the bias light onto an image pick up tube having a color selective stripe filter by means of the illustrated light source. The test showed, however, that the shading is impractically large, although the lag is reduced to some extent. The shading was found to be large in the direction perpendicular to the longitudinal direction of the color selective stripe filter, i.e. in the direction in which the color selective stripe filter is arrayed, and to have a pattern biased for respective colors. These phenomenon have been proved to be inherent in the image pick up tube having a color selective stripe filter.

SUMMARY OF THE INVENTION

It is therefore an object of the invention to get rid of the described shading and to remove the deviation of the pattern of the shading depending on the colors, so as to provide a practical means for imparting a bias light to an image pick up tube having a color selective stripe filter used in a color TV camera relying upon spatial frequency multiplexing method.

To these ends, according to the invention, there is provided an imaging device in which a bias light is applied to a photo-converting portion of the imaging device in a direction substantially parallel with the longitudinal direction of the color stripe filter. In other words, the imaging device of the invention is characterized in that a bias light is applied in a direction substantially at right angle to the direction in which the color stripe filters are arrayed.

DESCRIPTION OF PREFERRED EMBODIMENTS

Figure 1A:
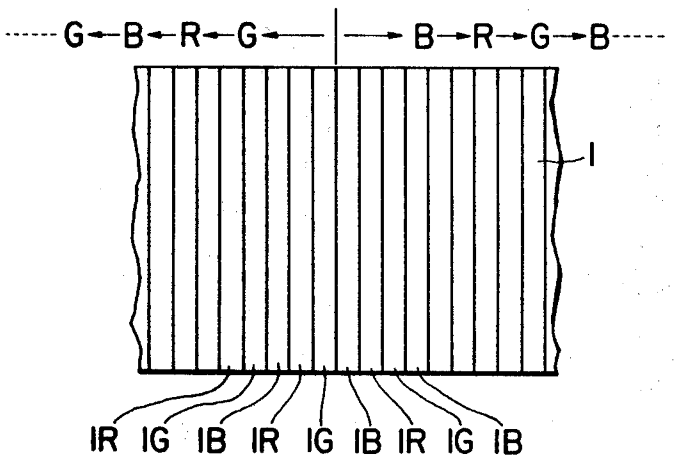
FIG. 1a PRIOR ART
FIG. 1*a* is an illustration showing an arrangement of color selective stripe filters in a color image pick up device.
Figure 3A:
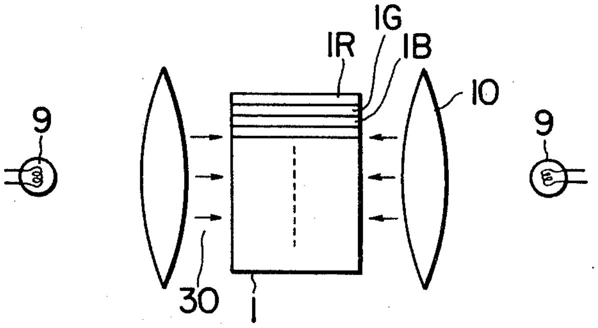
FIG. 3*a* is a plan view explanatory of the theory on which the present invention is based.
Figure 3B:
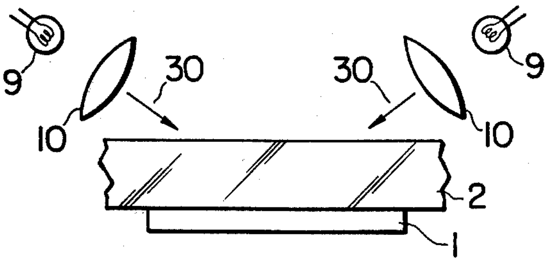
FIG. 3*b* is a sectional view for showing the theory of the invention.

Referring to FIGS. 3*a* and 3*b* illustrating the theory of the invention, it is to be noted that the plan view of FIG. 3*a* has been rotated through about 90°, from the posture of FIG. 1*a*, on the sheet. A light source 9 is disposed on a longitudinal extension of the color selective stripe filter 1. The light from the light source 9 is converted into a light beam parallel to the longitudinal direction of the color selective stripe filter 1, by a lens 10. Consequently, as will be seen from FIG. 3, the color selective stripe filter needs not be considered as being separated in a striped manner against the light. It has been confirmed by an experiment using this arrangement that no shading is caused at all in the direction normal to the color selective stripe filter 9.

This clearly indicates that the color selective stripe filter 1 has a different arrangement of colors at both sides of the axis of the tube, rather than symmetrical with respect to the axis. More specifically, as will be seen also from the arrangement as shown in FIG. 1*a*, the leftward color arrangement as viewed from the center of the filter includes G (green), R (red), B (blue) and G . . . in the mentioned order, while the rightward arrangement included B, R, G, B . . . in the referred order. It has been proven that this phenomenon constitutes one of the reasons for causing the shading. At the same time, it has been proven that respective colors have their own deviations of the bias-lighting and the spectral characteristics of the image pick up tube.

In addition, it has been confirmed that the light applied in the normal direction causes a shading. This is attributable to the fact that the mixing of colors such as G to B, B to R, R to G in the light from the left-hand side, and G to R, B to G, R to B in the light from the right-hand side, takes place until the light 6 from the object and the bias light having an incident angle of 90° reach, respectively, the conductive film (signal electrode) 4, after having passed the respective color selective stripe filters, because of the large thickness of the protecting transparent film 3 and the like reasons, as will be seen from FIG. 1.

This leads to a conclusion that the bias-light must be applied in the direction parallel to the longitidinal direction of the color stripe filter 1, in order to get rid of the shading.

It has also been confirmed that the shading generated in the longitudinal direction of the color selective stripe filter can be removed by suitably adjusting incident angles of lights from the light source 9 to the lens 10 of FIG. 3*b*.

The preferred embodiments of the invention will be described hereinafter, which are obtained by modifying and improving the arrangement of FIGS. 3*a* and 3*b* which involves a practical problem in that a large lens system is required for obtaining the parallel light beam.

EMBODIMENT 1

Figure 4A:
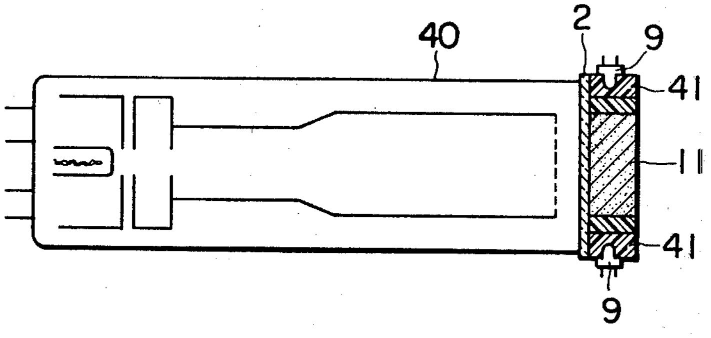
FIG. 4*a* is a sectional view of an image pick up tube provided with a bias-light fixture in accordance with the invention.
Figure 4B:
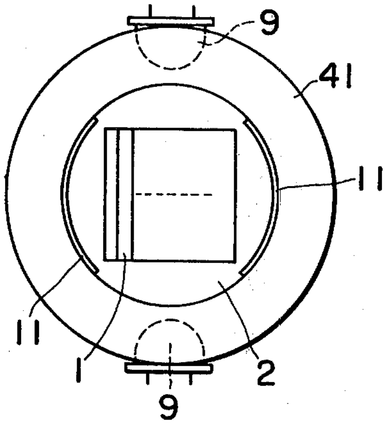
FIG. 4*b* is a front elevational view of a bias-light fixture which constitutes a first embodiment of the invention.

FIGS. 4*a* and 4*b* in combination show an embodiment of the invention, in which FIG. 4*a* is a sectional view of an image pick up tube having means for applying bias-light, while FIG. 4*b* is a front elevational view of the same. Referring to these drawings, a tube body 40 of the image pick up tube has a face plate 2. The source of the bias light is denoted here also by numeral 9. A supporting ring 41 is made of a material such as tefron or the like, and is adapted to function as a light diffusing plate by itself.

In order to interrupt the light which gets into the color selective stripe fliter 1 in the direction perpendicular to the direction of array of the later, a non-transmissive part portion 11 is formed by applying a non-transmissive substance such as carbon or the like.

Figure 2A:
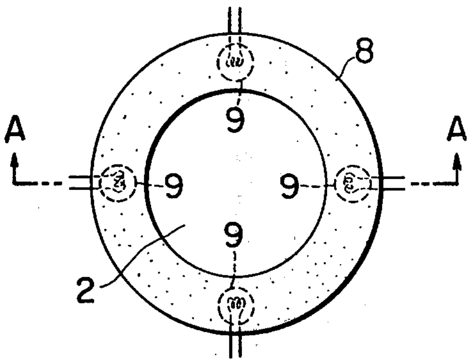
FIG. 2a PRIOR ART
FIG. 2*a* is a front elevational view of a conventional bias-light fixture.
Figure 2B:
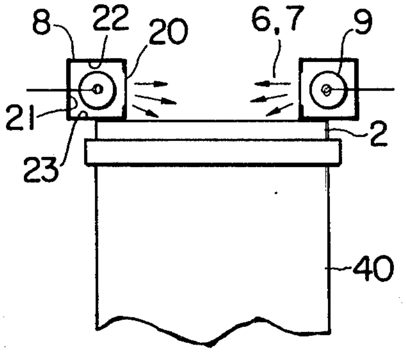
FIG. 2b PRIOR ART
FIG. 2*b* is an illustration explanatory of a mounting of the conventional bias-light fixture.

Needless to say, the box 8 accomodating the light source as illustrated in FIGS. 2*a* and 2*b* can be used in place of the supporting ring 41. The support ring 41 may be rectangular, or may be split into opposing sections. Materials consisting of a plastics plate in which metallic powders and bubbles are dispersed can be used effectively as the material for the light diffusion plate, as well as homogeneous plastics such as polyethylene, teflon and the like.

EMBODIMENT 2

Figure 5A:
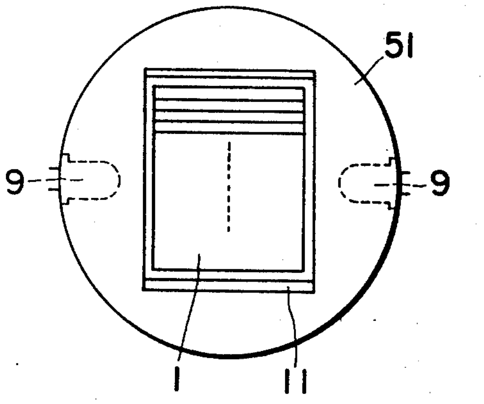
FIG. 5*a* is a front elevational view of another bias-light fixture which constitute a second embodiment of the invention.
Figure 5B:
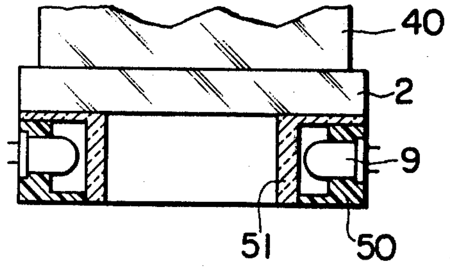
FIG. 5*b* is a partial sectional view of the bias-light fixture of FIG. 5*a*.

FIG. 5*a* shows a front elevation of a second embodiment of the invention, while FIG. 5*b* shows the sectional side elevational view of a bias-light element of this embodiment. Referring to these Figures, numerals 50 and 51 denote a support for the bias-light source and a light diffusion plate, respectively. The inner surface of the plastic-made support 50 is a mirror or a light diffusion surface painted in white, so that the light emitted from the source 9 may be multi-reflected and uniformly spread or diffused. The light is further diffused by the light diffusion plate 51 and applied onto the face plate 2.

The light diffusion plate 51 and the support 50 have rectangular openings in correspondence with the raster of the image pick up tube. The light source 9 is provided on the extension of the stripe filter, as shown in Figures, which ensures, in combination with the non-transmissive portion 11, application of the bias light only from the direction of the extension of the stripe filter.

EMBODIMENT 3

Figure 6A:
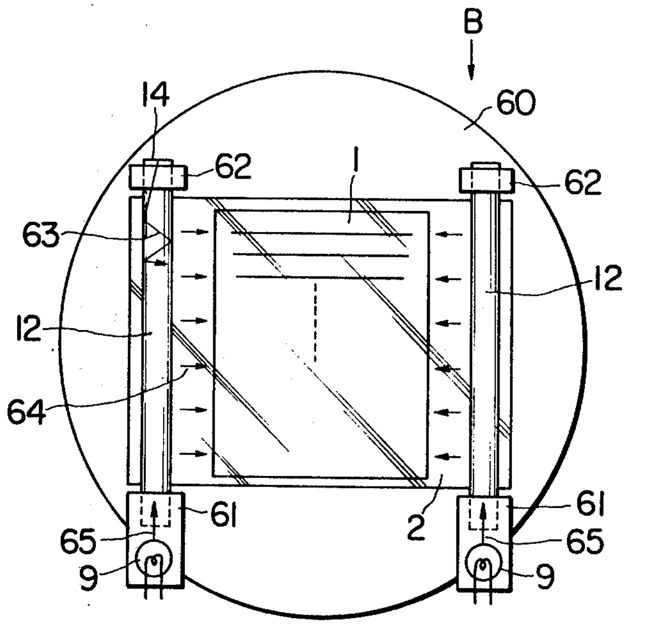
FIG. 6*a* is a front elevational view of still another bias-light fixture which constitutes a third embodiment of the invention.
Figure 6B:
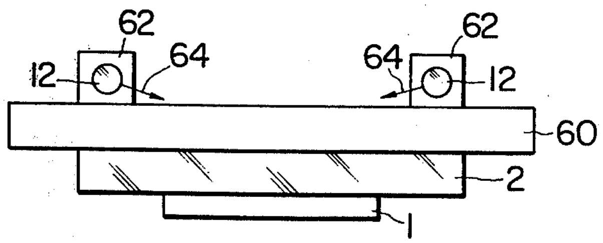
FIG. 6*b* is a side elevational view of the bias-light fixture of FIG. 6*a*.
Figure 6C:
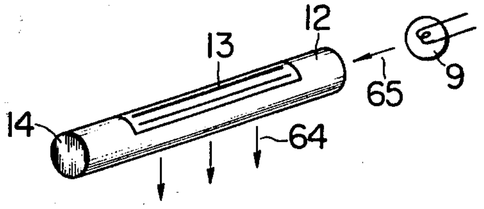
FIG. 6*c* is a three-dimensional enlarged view of a glass rod of the bias-light fixture of FIG. 6*a*.

FIGS. 6*a* to 6*c* in combination show a third embodiment of the invention in which FIG. 6*a* is a front elevational view of the bias-light fixture, FIG. 6*b* is a side elevational view of the bias-light fixture as viewed in the direction of B showing the stripe filter 1 and the glass substrate plate 2 for convenience's sake.

In these Figures, a light-transmissive glass rod 12 (this may be substituted by a plastics) is adapted to receive the light 65 from the light source 9 directly or through a light-conductive passage such as optic fibers. The glass rod is arranged, as shown in FIG. 6*a*, at right angle to the longitude of the color selective stripe filter 1, at the outside, so as to sufficiently cover the effective photo-converting surface. This arrangement allows only the light along planes substantially in parallel with the color selective stripe filter 1 to pass, while the lights at right angle to the filter 1 or intersecting the later are extinguised, so that a bias light having no shading can be obtained.

As will be seen from the enlarged three-dimentional view of FIG. 6*c*, the light-transmissive glass rod is provided with light-reflecting surfaces 13 and 14, so that the light emitted from the light source 9 is multi-reflexed as denoted by 63 in the glass rod 12, and is emitted from the arc at the opposite side to the reflecting surface 13.

Therefore, the shading in the longitudinal direction of the color selective stripe filter can be negated by adjusting the glass rod 12 in the rotational direction, keeping the later unmoved in the longitudinal direction.

For informations, in FIGS. 6*a* to 6*c*, a portion in support of the glass rod 12 and the light source 9 is denoted by numeral 61. Numeral 62 denote a portion for supporting the glass rod 12, while numeral 60 denotes a base for the bias-light fixture, made of a plastics or the like material and including the supporting portions 61 and 62.

Figure 1B:
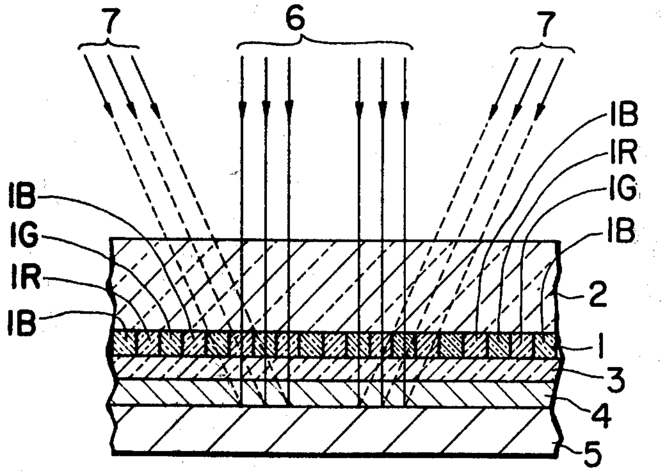
FIG. 1b PRIOR ART
FIG. 1*b* is a sectional view of a face plate of a color image pick up tube.

The transparent electrode 4 and the photoconductive film 5 as shown in FIG. 1*b* are neglected from FIG. 6*b*.

EMBODIMENT 4

Figure 7A:
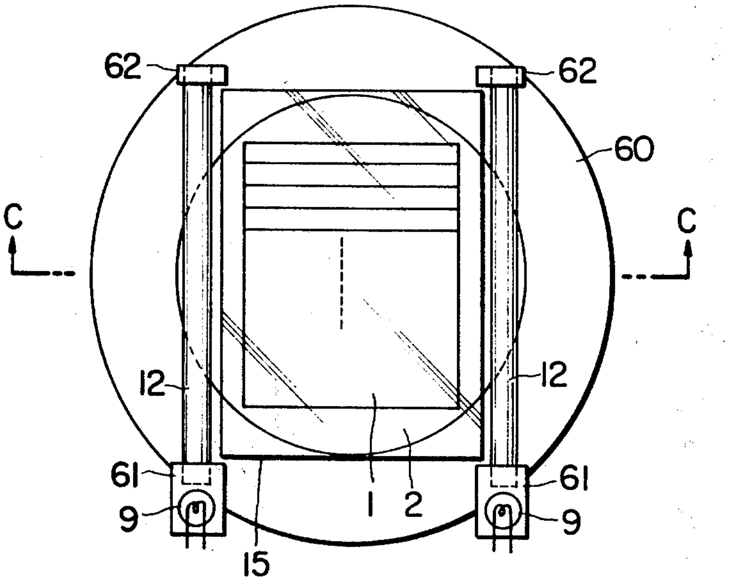
FIG. 7*a* is a front elevational view of a bias-light fixture which constitutes a fourth embodiment of the invention.
Figure 7B:
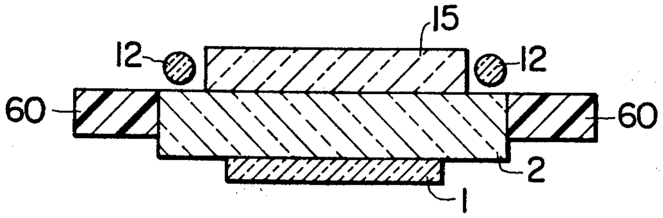
FIG. 7*b* is a sectional side elevational view of the bias-light fixture of FIG. 7*a*.

FIGS. 7*a* and 7*b* show a fourth embodiment of the invention.

More specifically, FIG. 7*a* is a front elevational view of the bias-light fixture, while FIG. 7*b* is a side elevational sectional view of the same taken along the line C—C. The glass substrate plate 2 and the color selective stripe filter 1 are shown for convenience's sake.

Referring to FIGS. 7*a* and 7*b*, a light transmissive plate 15 (about 5 mm in thickness) of a material having large refractive index, so that the bias light may be efficiently introduced from one side thereof, and so that the moire by the detail of the color selective stripe filter and the light from the object may be avoided. Thus, the light transmissive plate 15 functions as a spatial frequency low pass filter for reducing the spurious color signal.

Figure 8:
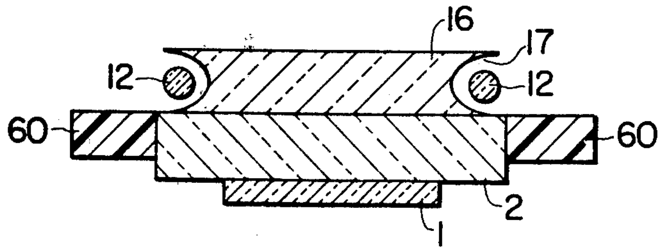
FIG. 8 is a sectional side elevational view of a modification of FIG. 7*b*.

Referring to FIG. 8 showing a modification of the arrangement of FIGS. 7*a* and 7*b* for facilitating the glass rod, the section shown therein corresponds to that of FIG. 7*b*. The glass rod can be unitarily attached to a recess 17 formed in the light transmissive plate 16, by means of a resin and the like, as shown in FIG. 8.

Throughtout the foregoing embodiments, the amount of bias light for the colors can be adjusted by means of the light from the light source or by a provision of a light-adjusting coloured filter at the output side of the bias-light fixture.

The same result will be obtained by substituting the portions in respective embodiments constituting secondary light source surfaces by a lamp like a pipe or other light source having an elongated light emitting portion.

As has been described, according to the invention, the lights intersecting the color selective stripe filter is excluded to reduce the shading of the bias light, so as to provide a color TV camera having small lag and color shading.

Conventionally, the bias-light method could not practically applied to the image pick up tube having a color selective stripe filter, because of the generation of the shading. It will be seen that the present invention promises a remarkable effect over the prior arts to make it possible to apply the advantageous beam-light method through reducing the shading.

What is claimed is:

1. An imaging device having a color selective stripe filter and means for applying a bias-light adapted to apply a light of a predetermined intensity, irrespective of the light from an object, onto a photo-converting portion of the imaging device so as to reduce the lag in said imaging device, characterized in that said means for applying bias-light are adapted to apply a bias-light from a light source to said photo-converting portion as a light substantially in parallel with the longitudinal direction of said color selective stripe filter.

2. An imaging device as claimed in claim 1, wherein said means for applying bias-light includes a box having at its center an opening for introducing a focused bundle of light of said object therethrough and a light source accomodated by said box, said box having an inner peripheral surface constituting a light diffusion surface and a portion not transmissive to light for interrupting lights running in a direction perpendicular to the longitudinal direction of said color selective stripe filter.

3. An imaging device as claimed in claim 2, wherein all of the inner surfaces of said box other than the inner peripheral surface constitute light diffusion surfaces.

4. An imaging device as claimed in claim 1, wherein said means for applying bias-light include a light source and a supporting body made of a light diffusing material and provided with an opening for introducing a focused light beam from said object at its center, said light source being embedded in said supporting body at a portion thereof on the extension of the longitudinal line of said color selective stripe filter, said supporting body being provided at its portion perpendicular to the longitudinal direction of said color selective stripe filter with a portion not transmissive to light.

5. An imaging device as claimed in claim 1, wherein said means for applying said bias-light are constituted by a light-transmissive rod having a side surface along the length thereof for diffusing the introduced light externally, said rod being optically coupled with said light source and arranged solely or in plural to extend in the direction perpendicular to the longitudinal direction of said color selective stripe filter.

6. An imaging device as claimed in claim 1, further characterized by comprising a light-transmissive plate having a large index of refraction having one side opposed by said bias light source.

7. An imaging device as claimed in claim 5, wherein means are provided for holding said light-transmissive rod for free rotation, so as to render the angle of incidence from said light-transmissive rod to the photo-converting surface of said image pick up tube adjustable.

8. An imaging device having a bias-light system adapted to supply a light of a predetermined intensity onto a photo-converting surface of a photoconductive image pick up tube provided with a color selective stripe filter, irrespective of the light from an object, so as to reduce the lag in the image pick up tube, characterized in that a light source for a bias-light is disposed optically confronting said photoconverting surface at a position not to hinder the focused light beam from the object, said bias-light being adapted to be introduced from the outside of said image pick up tube into said photo-converting surface, in a direction substantially in parallel with the longitudinal direction of said color selective stripe filter.

* * * * *